United States Patent [19]

Richter et al.

[11] 3,903,712

[45] Sept. 9, 1975

[54] DRIVE UNIT

[75] Inventors: Gerhard Richter, Wuppertal; Klaus Stein, Neviges, both of Germany

[73] Assignee: Vorwerk & Co. Elektrowerke KG, Wuppertal, Germany

[22] Filed: Mar. 11, 1974

[21] Appl. No.: 450,224

[30] Foreign Application Priority Data

Mar. 14, 1973 Germany.......................... 2312636

[52] U.S. Cl. ............... 64/30 E; 192/82 T; 64/30 R
[51] Int. Cl. ............................................. F16d 7/02
[58] Field of Search ............... 64/30 R, 30 E, 30 A; 192/82 T

[56] References Cited
UNITED STATES PATENTS

| | | | |
|---|---|---|---|
| 2,320,900 | 6/1943 | Walz | 192/82 T |
| 2,763,141 | 9/1956 | Dodge | 64/30 R |
| 2,847,095 | 8/1958 | Sohlberg et al. | 192/82 T |
| 2,879,874 | 3/1959 | Malmros | 192/82 T |
| 3,503,478 | 3/1970 | Neumann | 64/30 R |

FOREIGN PATENTS OR APPLICATIONS

| | | | |
|---|---|---|---|
| 1,000,420 | 12/1961 | United Kingdom | 192/82 T |
| 1,221,859 | 7/1966 | Germany | 64/30 |

*Primary Examiner*—Samuel Scott
*Assistant Examiner*—Randall Heald
*Attorney, Agent, or Firm*—Michael S. Striker

[57] ABSTRACT

A driving member is connected to a driven member by a friction clutch member which engages a surface on one of said members and thereby normally transmits drive energy from the drive member to the driven member, but permits the friction member to slip relative to said surface upon blocking of the driven member, thereby generating heat in said friction member. Bimetallic spring means connect the friction member to the driving member. Dependent on the extent and duration of said blocking of the driven member, the generated heat raises the temperature of the bimetallic connecting spring means, thereby causing this connecting spring means to reduce and ultimately to interrupt the frictional engagement of the friction clutch member with the surface engaged thereby. The accumulated heat is then given off and frictional contact is reestablished.

9 Claims, 3 Drawing Figures

DRIVE UNIT

BACKGROUND OF THE INVENTION

The invention relates to drive units for devices such as household floor conditioning machines and the like wherein power is transmitted from a driving member to a driven member and a mechanism is provided to protect the apparatus from injury and possible destruction when the driven member is blocked. Heretofore, frictional clutch means have been used for transmitting energy from the drive member to the driven member and if the latter member was blocked, the device was protected from destruction overload by mechanisms which, in the most advanced constructions used up to now, utilized mechanically interengaging clutch detent means.

For example, in a typical and advanced known device the drive means and the driven means were normally held in contact with one another by a pressure spring and were interconnected by detent cone means, for example a detent cone on the drive member and a matching cone socket on the driven member. Also provided was a collar on one of these members with a peripheral groove therein and with an inclined groove extending therefrom toward the other member for receiving a pin. In the normal working condition of the apparatus the pin engaged the inclined guide groove. When the driven member was blocked this caused pressure between the inclined sides of the cone elements, and between the pin and its inclined guide groove, against the pressure of the pressure spring. As a result the cone elements were separated from one another, the pin slid into the peripheral groove, and the drive and driven member were thereby held separated from one another.

Such devices protect the apparatus from injury and destruction caused by the blocking of the driven member. However, they have a number of drawbacks. The mechanisms whereon they rely require a large number of parts as well as space from the same; the incidence of trouble is considerable; and in most advanced devices of the indicated type provision is only made for two operative conditions: the normal one with one mutual arrangement of the catch and detent means and the blocked one with another mutual arrangement of these means, wherefrom the apparatus has to be specially and manually returned to normal operative condition.

SUMMARY OF THE INVENTION

It is an object of the invention to avoid the aforementioned problems and disadvantages of prior drive units.

It is another object to provide a drive unit which need not be specially returned to normal condition pursuant to a frictional overload caused by blocking of the driven member.

In particular, it is an object to provide an apparatus which makes it possible to transmit a constant drive moment and advantageously a driving torque moment from the drive to the driven means, dependent on the workload encountered by the driven means, so as to avoid injury to the mechanism on blocking of the driven means.

The invention achieves the objects by using frictional clutch means between the drive means and the driven means with friction controlling means dependent on the temperatures generated by the clutch friction.

In a preferred embodiment of the invention, a driving rotor has a driven rotor mounted thereon or therein, with clutch means therebetween using frictional clutch means in a peripheral region of the rotors. One of the rotors has the frictional clutch means mounted thereon by bimetal springs. The construction is such as to reduce the pressure applied by these springs, and by the frictional clutch means thereon against the clutch-engaging surface, and if necessary to move the frictional clutch means away from engagement with the surface normally engaged thereby, dependent on the temperature which is developed by the frictional clutch engagement.

The bimetal springs advantageously extend over a considerable distance in the clutch drum to points where they are mounted on a driving disc by a ring separable from this disc but permanently supporting the clutch springs. A key and groove engagement is preferably used for positive transmission of the driving force from the driving disc to the bimetal supporting ring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a chart of torque moments and temperatures typically encountered in the operation of the new device.

DESCRIPTION OF THE PREFERRED EMBODIMENTS

Figure 1:
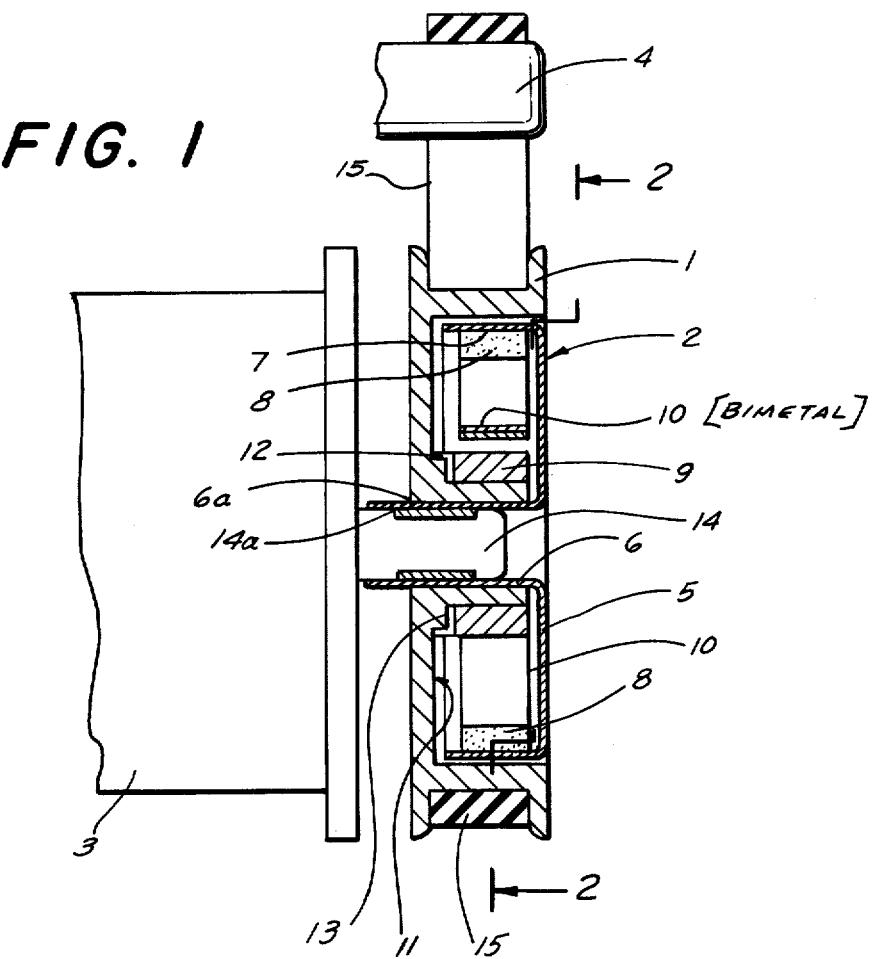
FIG. 1 is a side view, partly in section along lines 1—1 in FIG. 2, of a preferred embodiment of the invention.
Figure 2:
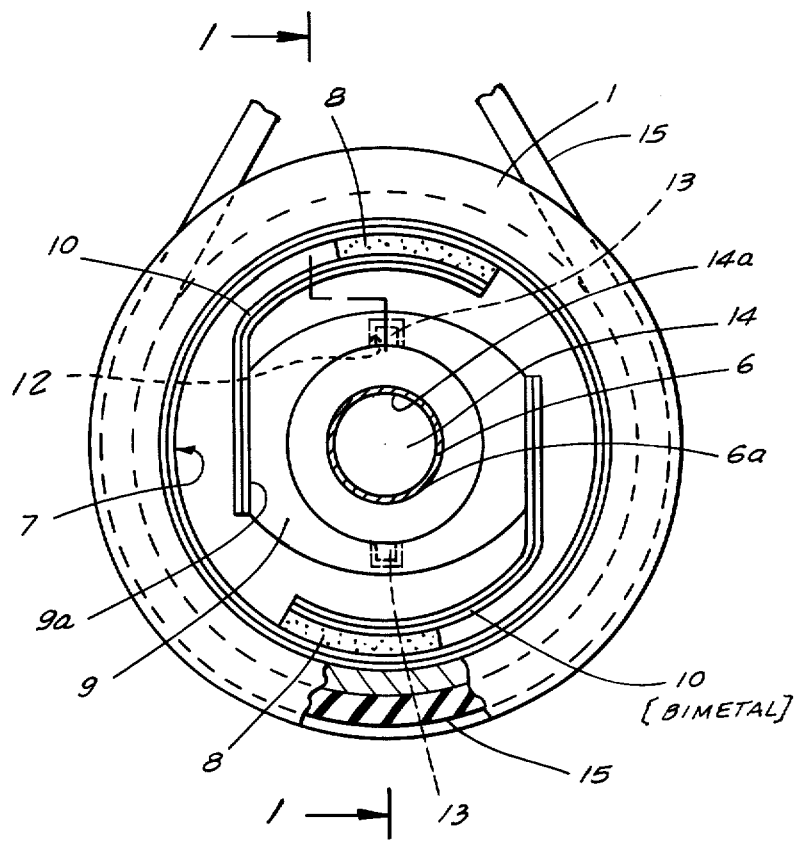
FIG. 2 is a end view of this embodiment partly in section along lines 2—2 in FIG. 1.

Drive wheel 1 by means of clutch apparatus 2 drives a household machine or device 3, which is subject to variable torque loads. Drive wheel 1 is driven by power means 4 which may, for example, be the output shaft of an electric drive motor (not shown). Parts 4 and 1 are interconnected by a drive belt 15.

Driving effort is transmitted from element 1 to device 3 by means including a drum 5 which is part of apparatus 2. The clutch drum 5 has a central hub 6 integral therewith and which has sliding rotary fit with drive wheel 1, at 6a, while the hub 6 is pressed onto power input shaft 14 of device 3, at 14a, for substantially rigid connection of drum 5 with shaft 14. For the transmission of driving effort from drive wheel 1 to drum 5 of clutch 2, and thereby to device 3, clutch drum 5 has a peripheral collar 7, the interior surface of which can be engaged by friction clutch members, such as shoes 8. According to the invention, each friction member 8 is mounted on an outer end of a bimetal spring 10.

The inner end of spring 10 is shown as being secured to a support ring 9. This ring in turn is releasably secured to a radially extending surface 11 of drive wheel 1, by means of grooves 11 recessed into ring 9 at peripherally spaced points, and of keys 13, correspondingly formed and projecting from peripherally spaced parts of surface 11. By means of this construction, ring 9 is rotated by drive wheel 1, and rotates the clutch springs 10 and friction members 8 thereon.

In the assembling of the apparatus, preassembled elements 8, 9, 10 can be inserted in clutch drum 5, establishing contact between friction members 8 and clutch surface 7; at this time no contact is necessary between ring 9 and other parts of the apparatus. Drive wheel 1 is then connected with the so assembled parts 5, 8, 9, 10 by engaging keys 13 on wheel 1 with grooves 12 in ring 9. The so connected parts 1, 5, 8, 9, 10 are then mounted on shaft 14 by pressing hub 6 of drum 5 onto this shaft.

The operation of the new temperature dependent friction clutch 2 can be explained most conveniently with reference to FIG. 3 wherein the curved line shows the interdependence between the torque moment transmitted by the clutch 2, and the temperature prevailing in bimetal springs 10 as a result of the clutch friction. Bimetal springs 10 are so selected as to provide for a certain maximum torque moment $M_{max}$ when the temperature of these springs 10 is at or adjacent the illustrated zero point which may be slightly below the normal ambient or room temperature. By constrast, the transmitted torque moment falls to zero when the temperature of springs 10 reaches a predetermined allowable maximum degree $T_{max}$.

In the normal operation, within the limits of torque load provided for device 3, the temperature maximum $T_{max}$ and the torque maximum $M_{max}$ are hardly reached and surely not exceeded. If, however, a torque load is encountered that is close to the torque maximum $M_{max}$ to be transmitted by clutch 2, clutch members 8 begin to slip and to slide on clutch surface 7, thereby generating frictional heat which is transmitted to springs 10 by friction members 8, thereby heating the clutch support springs 10. As these are strips of bimetal, their increased temperature causes them to curl so as to reduce the pressure of the members 8 on clutch surface 7, dependent on the generation of frictional heat. The curved line in FIG. 3 shows how the torque moment is decreased in response to increasing temperature. Ultimately, sufficient frictional heat has been generated to cause springs 10 to fully remove clutch members 8 from clutch surface 7 at the maximum temperature $T_{max}$.

This heat is rapidly dissipated by transfer from the surfaces of the clutch apparatus including clutch springs 10 as these springs extend through major portions of the space in clutch drum 5; as shown, each spring 10 extends through almost one-half of the complete circle available for this purpose. Accordingly, these springs return rapidly to normal ambient temperature, and the springs 10 then reestablish contact, with slight pressure, between clutch elements 7 and 8. As a result the torque moments transmitted by clutch 2 will periodically increase and decrease between limits (not shown) which usually lie between the maximum values $M_{max}$ and $T_{max}$. When the load on device 3 is close to zero, the bimetallic pressure springs 10 rapidly return to their initially provided conditions, thereby reestablishing the maximum torque moment $M_{max}$ by fully automatic operation.

It is one of the advantages of the invention that the frictional clutch apparatus 2 requires only a minimum of space and still allows operation of a driven machine, such as a household device 3 driven by electric motor means 4 at torque moments preestablished for the drive and controlled by the successive loads with the device 3 encounters. It is a further advantage of the invention that the elements required for this drive are subject only to a minimum of trouble, thus protecting both the device 3 and drive 1, 2, 4 from damage and destruction in the case of high torque loads, and even on full blocking of the tool 3. A further advantage of the new apparatus is that the thermal control of torque moments, including the return to normal operative conditions, is fully automatic and is in no way dependent on assistance rendered by the operator or by service personnel. Still another advantage is that only minor parts of the drive energy are converted into heat, except for the specially provided and controlled use of frictional heat in the clutch unit, thereby facilitating the operation of the unit by simple and effective drive means, belts or tooth belts 15.

It will be understood that each of the elements described above, or two or more together, may also find a useful application in other types of constructions differing from the type described above.

While the invention has been illustrated and described as embodied in a drive unit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A drive unit, especially for household appliances and floor-treating machines, comprising a drive member; a driven member; one of said members having an engaging surface; and clutch means between said driven member and said drive member, said clutch means comprising at least one friction member for frictionally engaging said engaging surface of said one member for transmitting a drive from said drive member to said driven member by permitting said friction member to slip relative to said engaging surface upon blocking of said driven member under simultaneous creation of heat in said friction member, and means connecting said friction member to the other member and arranged to be in direct contact along a portion thereof with said friction member so that the heat created in said friction member will be transmitted to said last-mentioned means to thereby control the frictional engagement between said engaging surface and said friction member in dependence on the temperature of the latter.

2. A drive unit as defined in claim 1, wherein said drive member is a wheel and said driven member is a drum coaxial with said wheel, said engaging surface being generally peripheral of said drum.

3. A drive unit as defined in claim 2, wherein said clutch means is disposed in its entirety inside said drum.

4. A drive unit as defined in claim 2, wherein said drum has a hub, with a surface of said hub having sliding fit relative to said wheel, and also has a surface of said hub disposed for press-fitting to a power input shaft of the device to be driven by the drive unit.

5. A drive unit as defined in claim 2, further including a ring attachable to said wheel for positive transfer of drive effort from the wheel to the ring, said ring supporting said connecting means.

6. A drive unit as defined in claim 1, wherein said means connecting said friction member to said other member comprises at least one bimetallic spring.

7. A drive unit as defined in claim 6, wherein one of said drive and driven members comprises a clutch drum; said bimetallic member has one end mounted on the other of said drive and driven members, and said friction member is mounted on the other end of the bimetallic spring and engageable with said clutch drum.

8. A drive unit as defined in claim 7, wherein said bimetallic spring extends arcuately between said ends thereof, thereby providing surface for the dissipation of heat derived from said frictional engagement and accumulated in said spring.

9. A drive unit as defined in claim 7, including a ring supporting said bimetallic spring, said ring and one of said drive and driven members engaging one another by a key and groove engagement.

* * * * *